United States Patent Office 2,967,073
Patented Jan. 3, 1961

2,967,073
MOTOR VEHICLE BODY WITH A PIVOTAL CLOSURE

Paul Gagliardi, 19 Ave. Auguste Blanqui, Aulnay-sous-Bois, France

Filed June 23, 1958, Ser. No. 743,595

Claims priority, application France June 29, 1957

8 Claims. (Cl. 296—28)

The present invention relates generally to motor vehicle bodies.

Motor vehicle bodies are known in which access to the driver's seat and to the passengers' seat is rendered possible owing to the provision of a rockable body element.

An object of the invention is to improve motor vehicle bodies of this type by the provision of a motor vehicle body of the type including a rockable element and characterized by the fact that said rockable element is constituted by a roof-and-door unit forming a portion of the top and sides of the body and having generally a yoke formation with limbs of substantially constant width pivotally supported at a position adjacent the rear angle of the ends of said limbs on a strain-resisting part of the vehicle body or in the neighborhood of said part so as to be rearwardly rockable to permit access to the vehicle seats.

Another object of the invention is to provide a vehicle body as aforesaid having a stationary front part and a rear part, the rockable roof-and-door unit being mounted between said parts and adapted to be rearwardly rocked about said rear part.

Another object of the invention is to provide a vehicle body as aforesaid whose rear part is pivotally supported by the main strain-resisting part of the vehicle on the swinging axis of said unit or adjacent said axis, said rear part being rockable inside the vehicle to permit a free access to those elements of the vehicle which are located underneath and to the engine where the latter is located in the rear portion of the vehicle.

A further object of the invention is to provide a vehicle body as aforesaid wherein the roof-and-door unit has runways along which transparent elements forming side panes are slidably received, thereby permitting said panes to be opened, the material of which the panes are made being advantageously distortable or pliant and preferably possessing such an elasticity as will permit the panes to remain by themselves in the position to which they have been brought.

A still further object of the invention is to provide a vehicle body as aforesaid wherein the roof is constituted by a one-piece element made of a suitable material, for example a plastic, though in a possible embodiment of the invention said roof may be divided into two parts meeting along the fore-and-aft axis of the vehicle, and may comprise additional runways permitting said roof portions to slide sidewise downwardly, thereby permitting the upper part of the vehicle to be opened while preserving side panels, the material of which said roof parts are made being an easily distortable or pliant material.

Preferably the vehicle is provided in its lower part with a main strain-resisting part utilizable for the pivotal mounting of the roof-and-door unit and the rear part of the vehicle body. Said main strain-resisting part projects sidewise and rearwardly with respect to said unit and to said rockable rear part even when the roof-and-door unit is in rocked position so as to form an encompassing buffer which prevents said unit from becoming damaged in case of shock or impact.

As will be understood, the opening of such a roof-and-door unit of yoke formation having limbs of substantially constant width permits a ready access to the vehicle seats. The seats themselves may be, if required, liftable rearwardly into contact with their back portion so as to permit the vehicle users to get up more easily and to walk through the vehicle for getting into it or getting out of it on the one or the other side of the vehicle.

With these and such other objects in view as will incidentally appear hereafter, the invention comprises the novel construction and combination of parts that will be now described with reference to the accompanying diagrammatic drawings exemplifying the same and forming a part of the present disclosure.

Figure 1:
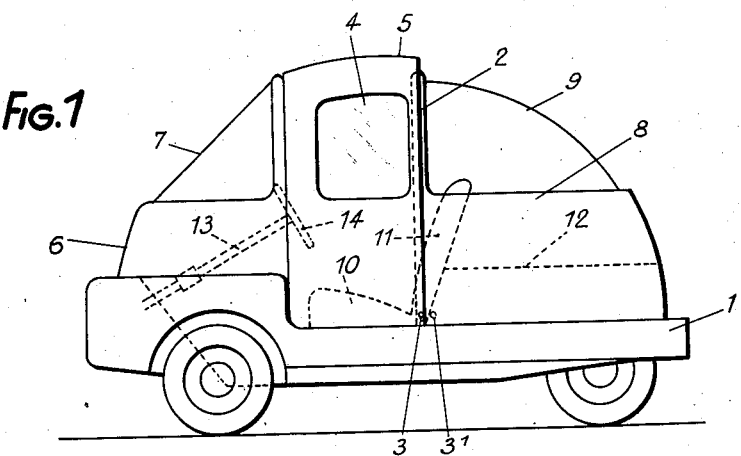
Figure 1 is a side view of a vehicle the body of which is in accordance with the invention, assuming the roof-and-door unit to be closed.
Figure 2:
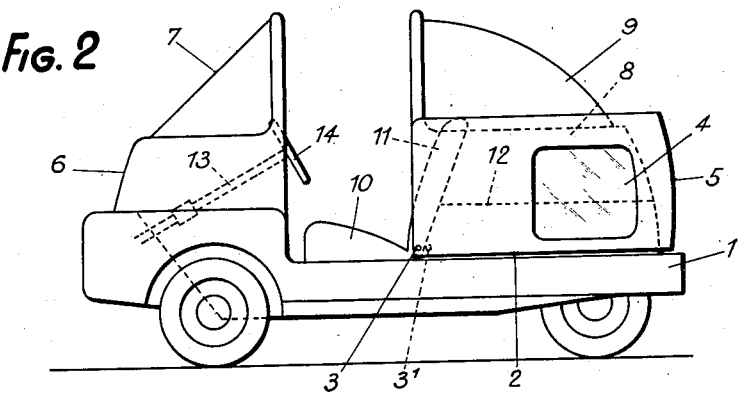
Figure 2 is a side view similar to Fig. 1 but assuming the roof-and-door unit to be opened.
Figure 3:
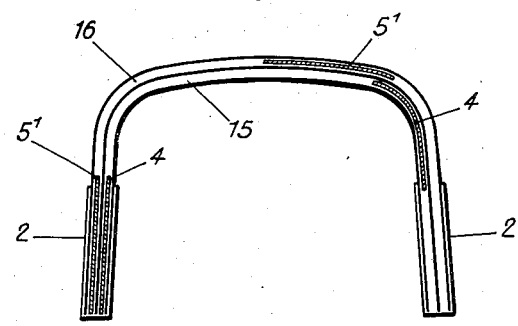
Figure 3 is a transverse sectional view of the roof-and-door unit according to a suitable constructional form, the thicknesses of the parts shown being exaggerated for the sake of clearness.

The motor vehicle body according to the invention comprises a main lower strain-resisting part or platform 1 on which is mounted for swinging or rocking motion a roof-and-door unit including doors 2 provided with side panes or lateral windows 4 and surmounted by a roof or strip 5 having the shape of an arch. This unit which in cross section is of yoke-like formation (as shown in Fig. 3) has limbs of substantially constant width. This peculiar formation is clearly visible in Figs. 1 and 2. The roof-and-door unit is hinged by pivot 3, which provides a transverse pivot axis, to the main strain-resisting part 1 adjacent an angle of the ends of said side limbs forming the doors as shown in Figs. 1 and 2.

The vehicle body also includes a front part or body superstructure 6 surmounted by a wind shield 7 of arch-shaped cross section, and a rear part or body superstructure 8 (which has a longitudinal vertical cross section in the shape of an arc, the center of which is located at the platform 1 and substantially coincides with pivot 3) surmounted by a panoramic curved pane 9. The vehicle as illustrated is of the type comprising an engine housed in its rear part. In the present case, the engine is accommodated underneath the luggage-supporting floor 12. According to a feature of the invention, the rear part 8-9 is pivotally supported by an axis $3^1$ on the main strain-resisting part 1 of the vehicle body adjacent the position 3 and can be forwardly swung inside the vehicle. This permits an easy access to the engine and to the underlying elements.

The vehicle seats are designated by the reference 10, and their back portions are indicated by 11, while 13 designates the steering column, and 14 the steering wheel.

It will be seen that in the opened position, the roof-and-door unit 2-5 defines on each side of the vehicle a free space or passage which is sufficient, even in the lower part of the vehicle, to permit an easy access to the vehicle seats. The passage is defined between spaced vertical planes defined in turn by the front and rear body superstructures 6 and 8. The seats proper 10 are preferably upwardly swingable into contact with their backs 11, thereby still further increasing the easiness of access.

Advantageously the overall size of the roof-and-door unit is such that said unit tightly follows the outline of the rear part 8—9 when it is rearwardly swung so as to facilitate the closing motion while the vehicle is running while lessening wind resistance. In closed condition, said unit is abutted along its front edge against a sealing gasket provided on the front part 6—7 of the vehicle body, while its rear edge defines with the front edge of the rear part 8—9 an overlapping joint which provides a gap so as to ensure a permanent ventilation of the housing which is closed during standstill of the vehicle or when it runs at a slow speed in rainy weather, thereby avoiding the formation of reek in the vehicle housing.

The roof-and-door unit can be opened by a rearward rocking motion as shown in Fig. 2 even when the vehicle is in motion without causing interference to the vehicle driver and can be closed even when the vehicle is running. The front edge of the rear part 8—9 over which the roof-and-door unit is swingable overhangs the top of the seat backs so as to protect the luggage compartment from the rain during the opening motion.

As shown in Fig. 2, the main strain-resisting part 1 projects laterally and rearwardly with respect to the swung door-and-roof unit so that the latter is protected if subjected to a shock or impact.

The panes 4 may be made of a transparent elastic material and are then received for sliding motion in runways which extend under the roof so that said panes may be opened while the roof-and-door unit remains closed. The distortable or pliant material of which the panes 4 are made may, owing to its elasticity, ensure their automatic hold in the required position of adjustment thanks to an arcuate shape in the curved junction between the roof and doors.

However, in the preferred constructional form which is shown in Fig. 3, the roof-and-door unit comprises a skeleton frame in which are provided runways 15, 16 which extend over the entire length of the yoke limbs. Said limbs are constituted adjacent their end portion by stationary panels forming the doors 2, while panes 4 and half roof panels $5^1$ may slide along the runways or slideways 15, 16 so as to open or close (as the case may be) associated openings in the roof-and-door unit. Said movable elements 4, $5^1$ are made of a distortable or pliant material which is transparent for the panes 4 and may be advantageously transparent for the roof $5^1$. In the left hand side of Fig. 3, said elements 4, $5^1$ are illustrated in opened position i.e. are withdrawn inside the door panels 2. The vehicle roof and panes are thus opened while the door panels subsist sidewise for passengers' safety. The right hand side portion of Fig. 3 shows said elements 4, $5^1$ in closing position. The arrangement of said elements within the thickness of the roof-and-door unit permits the latter to be rocked irrespective of the position occupied by said elements.

Constructional details may be varied without departing from the scope of the subjoined claims. It should be understood, moreover, that while the mechanical arrangement that has just been described applies to a vehicle comprising one seat or seat row, the invention is also applicable to a vehicle comprising two seats or seat rows. Furthermore, the roof-and-door unit might be made up of a pair of separately swingable symmetrical parts.

What is claimed is:

1. A motor vehicle comprising a platform, a front body superstructure integral with said platform, a windshield of arch-shaped cross section on said superstructure and terminating rearwardly at a substantially vertical plane, a rear body superstructure of arch-shaped cross section terminating forwardly at a substantially vertical plane spaced from the first said plane to provide an entry and exit passage between said superstructures, an intermediate movable body portion comprising a transverse strip of a width corresponding to that of the passage and having the form of an arch, said strip terminating downwardly at the platform, and means pivotally supporting said strip on said platform for movement about a transverse horizontal axis located substantially in the plane associated with the rear superstructure, and at the level of the platform, said strip pivoting between a vertical position in which it closes the passage and a horizontal position in which it surrounds the rear superstructure and rests on the platform, said strip having bottom edges which coincide with the plane associated with the rear superstructure with the strip resting on said platform.

2. A vehicle according to claim 1, in which the rear superstructure has a longitudinal vertical cross-section in the shape of a circular arc, the center of said circular arc being located at the platform, said transverse horizontal axis substantially coinciding with said center.

3. A vehicle according to claim 2, comprising means supporting the rear superstructure on said platform for pivotal movement about a transverse horizontal axis coinciding with its curvature center.

4. A vehicle according to claim 3, wherein the rear superstructure is accommodated within the intermediate portion and within the front superstructure when pivoted forwardly.

5. A vehicle according to claim 1, wherein the intermediate portion comprises lateral windows each including a pane of transparent and flexible plastic material vertically slidable in slideways provided in said intermediate portion above and below the windows.

6. A vehicle according to claim 1, wherein the intermediate portion is provided with an upper opening constituting an open roof, comprising a pane of flexible and plastic material sliding laterally in slideways provided in said intermediate portion for closing said roof.

7. A vehicle according to claim 1, wherein the intermediate portion has a front edge which forms a joint against the front superstructure and a rear edge which forms, together with the front edge of the rear superstructure, a ventilation gap.

8. A vehicle according to claim 1, wherein the platform laterally projects beyond the intermediate portion and the rear superstructure to protect the means defining their pivoting axes from shocks.

References Cited in the file of this patent

FOREIGN PATENTS

| | | |
|---|---|---|
| 597,843 | France | Sept. 11, 1925 |
| 1,001,604 | Germany | Jan. 24, 1957 |
| 583,960 | Great Britain | Jan. 3, 1947 |